Dec. 25, 1962     F. L. LE BUS, SR., ET AL     3,070,170
BALL LATCH WASH-OVER SPEAR APPARATUS
Filed April 8, 1959     3 Sheets-Sheet 1
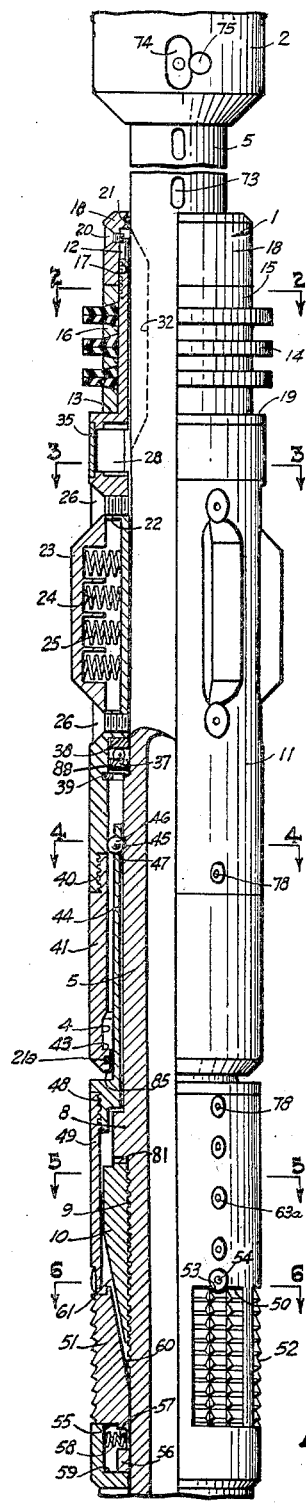
Fig. 1
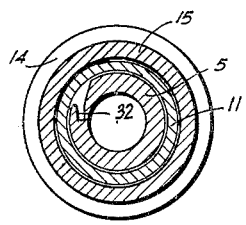
Fig. 2
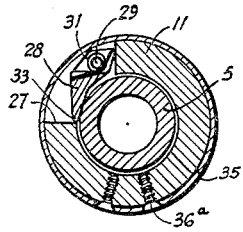
Fig. 3
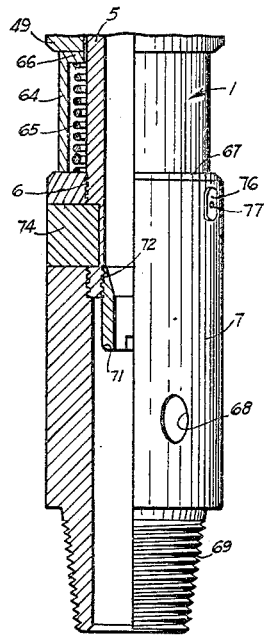
Fig. 1A
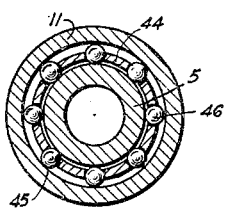
Fig. 4
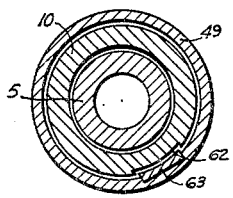
Fig. 5
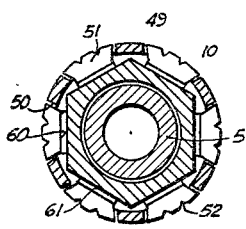
Fig. 6
INVENTORS
F. L. LeBus Sr.
J. J. Cox
Cecil Ware
BY
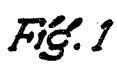
ATTORNEY Dec. 25, 1962   F. L. LE BUS, SR., ET AL   3,070,170
BALL LATCH WASH-OVER SPEAR APPARATUS
Filed April 8, 1959   3 Sheets-Sheet 2

INVENTORS
F. L. LeBus, Sr.
J. J. Cox
Cecil Ware
BY
P. M. McKnight
ATTORNEY

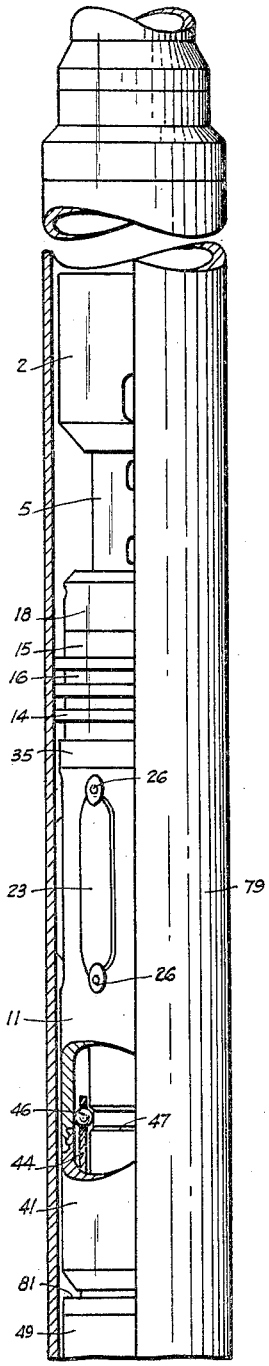
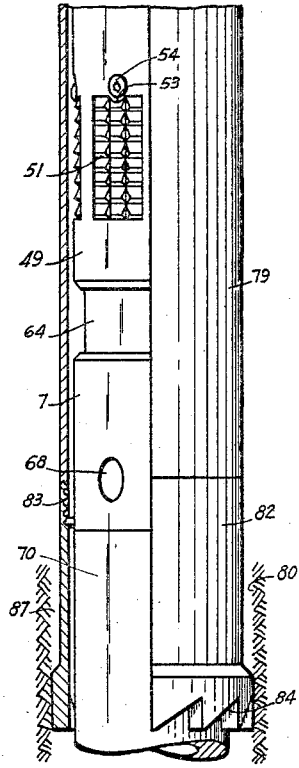
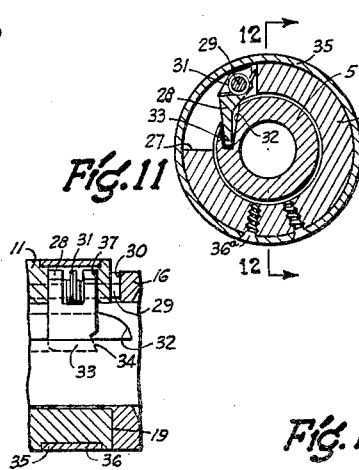
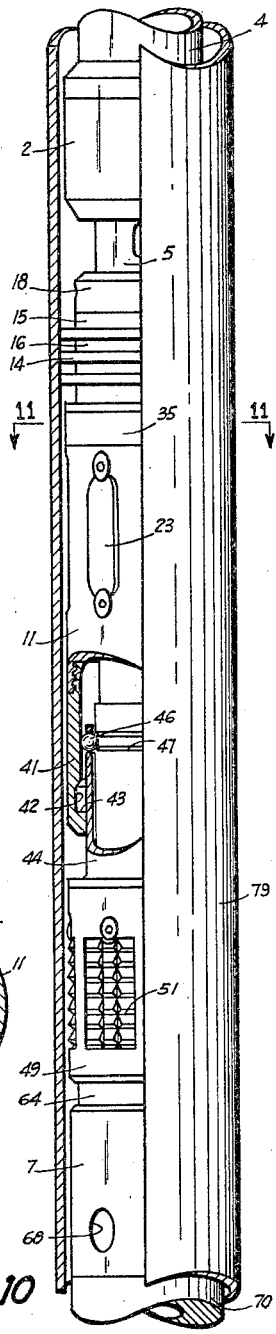

United States Patent Office 3,070,170
Patented Dec. 25, 1962

3,070,170
BALL LATCH WASH-OVER SPEAR APPARATUS
Franklin L. Le Bus, Sr., Jesse J. Cox, and Cecil Ware, Longview, Tex., assignors to Wash Overshot and Spear Engineers, Incorporated, Longview, Tex., a corporaion of Texas
Filed Apr. 8, 1959, Ser. No. 804,975
7 Claims. (Cl. 166—237)

This invention relates to improvements in fishing tools, and more particularly, but not by way of limitation, to a fishing tool apparatus for the catching of loosened pipe or drill collars that have become stuck in an off bottom position in the well bore. This application is an improvement over the prior pending application filed by F. L. Le Bus, Sr. and Cecil Ware, Serial No. 697,861, now Patent No. 3,003,561.

In the drilling of wells by the rotary drilling method, and particularly in the drilling of deep wells, the well bore frequently deviates from the true vertical. These deviations are normally caused by the drill bit contacting the slanting geological sub-surface structures and being forced from its true vertical course. When drilling a deep oil well by the rotary method, the drill bit is secured to the lower end of one or more drill collars and the drill collars are in turn suspended from a long string of drill pipe. The drill collars are tubular members, usually approximately thirty feet in length, and are substantially heavier and more rigid than the regular drill pipe. In the event the drill bit is forced from a true vertical direction during the drilling operation, the drill collars will contact the side of the well bore and tend to remain in a vertical position. When this occurs, continued rotation of the drilling string will cause the drill collars to rub the side of the well bore and form a smaller bore in the earth slightly off-set from the well bore formed by the drill bit. These off-set bores formed by the drill collars are commonly known as "key seats."

When a drill bit is being removed from a well bore containing one of these key seats, the bit frequently becomes lodged therein to prevent immediate removal of the complete drilling string from the well bore. The usual practice, when such a condition occurs, is to disjoint the drill pipe and a portion of the drill collars for removal from the well bore, leaving the drill bit and one or more drill collars lodged in the key seat. In some instances, the drill pipe or collars may become broken off and stuck off the bottom of the bore. Under either condition, it is customary to wash over and around the stuck portion for retrieving the lodged pipe by the use of a wash-over pipe carrying a spear apparatus engageable with the upper end of the stuck pipe so that upon a loosening of the stuck pipe, the spear apparatus will be engaged with the wash-over pipe and prevent the loosened pipe from falling to the bottom of the bore. The fish is subsequently pulled out of the well bore through the connection with the spear apparatus.

In fishing tools of this type, it is usually necessary to provide additional sections of drill pipe to drilling string in order to continue the downward rotation and reaming of the wash-over pipe around the fish stuck in the well bore. In adding the extra sections, it is necessary to move the wash-over pipe vertically upward and where the retrieving tool is stationary with the stuck fish, such upward movement will usually cause a simultaneous vertical upward movement of the locking slips with respect to the tapered faces of the operating bushing, thereby relocking the slips of the retrieving tool with the wash-over pipe which is not to be desired in many instances. Consequently, during this upward movement of the wash-over pipe, it is necessary to maintain the slips in a released condition and preclude any operation thereof during the vertical upward movement of the wash-over pipe.

The slips are usually held in a released position by the downward pressure of the drilling fluid due to the pump pressure acting on the upper surface of a restriction member. Frequently, the pump pressure is insufficient for holding the housing carrying the slips in a downward position, and the housing may move vertically upward. This upward movement causes the slips to engage the tapered surface of the operating bushing whereby the slips are moved slightly radially outward. While the slips are not actually engaged with the wash-over pipe, it will be apparent that a restriction is provided in the annular space between the wash-over pipe and the retrieving tool. As a result, debris which may be present in the bore hole, such as broken pieces of tongs, rubber packing rings, broken slips, or the like, may become lodged between the slips and the wash-over pipe whereby a vertical upward movement of the wash-over pipe will tend to wedge the lodged debris between the wash-over pipe and the slips, thereby moving the slips further upward over the operating bushing and setting the slips securely against the wash-over pipe, thus precluding further free movement of the wash-over pipe until the slips are again disengaged.

This invention is generally concerned with a fishing tool apparatus for stuck fish in a well bore having a wash-over pipe and reamer in which is disposed a spear retrieving tool normally in firm engagement therewith to permit a positive threading engagement of the retrieving tool with the stuck fish during a make up of the apparatus, and further, the fishing tool provides for a released condition of the wash-over pipe with the retrieving tool after a make up of the tool with the stuck fish to permit the wash-over operation. The tool apparatus is provided with positive latching means to maintain the wash-over pipe in the released condition relative to the engaging slips and thus permit vertical movement of the wash-over pipe without any re-engagement of the tool with the wash-over pipe during this operation. A complete free wheeling movement of the wash-over pipe may be accomplished by a rotation thereof in one direction to actuate a lock mechanism for maintaining the released condition of the retrieving tool with the wash-over pipe. When it is desired to raise the wash-over pipe and retrieving tool with the released fish for recovery thereof, the tool may be rotated in a right hand direction for engaging the slips firmly with the wash-over pipe whereby the entire unit may be withdrawn from the well bore.

It is an important object of this invention to provide a spear unit adapted to cooperate with a wash-over pipe for retrieving stuck pipe wherein the spear unit may be alternately engaged with or released from the wash-over pipe so that engagement will permit movement of the spear unit with the wash-over pipe, or in disengagement will permit movement of the wash-over pipe relative to the spear unit, thus providing vertical movement of the wash-over pipe if desired after connection of the spear with the stuck pipe, but leaving the spear unit in a position to engage the wash-over pipe in the event the stuck fish should become loosened and drop in the well bore.

It is a still further object of this invention to provide an improved wash-over retrieving tool apparatus for recovery of lodged drill collars in a well bore wherein the engaging mechanism between the wash-over pipe and the retrieving tool is positively retained in a disengaged position during a free vertical movement of the wash-over pipe in the washing operation.

Another object of this invention is to provide an improved wash-over retrieving tool apparatus for recovery of lodged drill collars in a well bore wherein a ball latch connection is provided for maintaining the wash-over pipe engaging slips in a non-engaged position during vertical movement of the wash-over pipe in order to preclude any lodging or accumulation of debris between the slips and the wash-over pipe in the free vertical movement thereof with respect to the retrieving tool.

And still another object of this invention is to provide a wash-over tool apparatus for retrieving stuck drill collars in a well bore having a spear unit engaging the stuck fish in the well bore wherein said spear unit is normally anchored in the wash-over pipe for rotation therewith, yet may be releasably disconnected therefrom so that independent vertical movement of the wash-over pipe relative to the spear unit may be obtained and thereby providing variable movements or complete removal of the wash-over pipe leaving the spear unit engaged with the fish.

It is a still further object of this invention to provide a fishing tool apparatus for retrieving drill collars stuck off bottom of a well bore including a spear unit alternately anchored and released relative to a wash-over pipe and reamer and engageable with the stuck collars in a released position to permit continued reaming of the wash-over pipe and reamer and provided with a locking mechanism responsive to rotation of the wash-over pipe in one direction to maintain the spear unit in released position with the wash-over pipe.

A further object of this invention is to provide a fishing tool apparatus for retrieving drill collars stuck off bottom of a well bore wherein the fluid circulating through the tool during the washing operation is precluded from entering the working portions of the retrieving tool, thus preventing any passage of sand, and the like, thereto.

An additional object of this invention is to provide a fishing tool apparatus for retrieving drill collars stuck off bottom of a well bore whereby a quick actuating force is applied to the slips for facilitating the engagement thereof with the wash-over pipe immediately upon release of the slips from the latched position.

And still another object of this invention is to provide a fishing tool apparatus for retrieving drill collars stuck off bottom of a well bore wherein the retrieving spear unit may be easily assembled and disassembled for replacement of the various elements thereof due to wear and necessity of larger sizes.

Other objects and advantages of the invention will be evident from the following detailed description, read in conjunction with the accompanying drawings, which illustrate our invention.

In the drawings:

FIGURE 1 is a vertical broken elevational view partly in section illustrating the upper portion of the retrieving tool prior to insertion in the wash-over pipe.

FIGURE 1A is a lower extension of FIG. 1.

FIGURE 2 is a view taken on line 2—2 of FIG. 1.

FIGURE 3 is a view taken on line 3—3 of FIG. 1.

FIGURE 4 is a view taken on line 4—4 of FIG. 1.

FIGURE 5 is a view taken on line 5—5 of FIG. 1.

FIGURE 6 is a view taken on line 6—6 of FIG. 1.

FIGURE 9 is a vertical broken elevational view partly in section illustrating the upper portion of the retrieving tool in the wash-over pipe during the washing operation.

FIGURE 9A is a lower extension of FIG. 9.

FIGURE 10 is a vertical broken elevational view partly in section depicting the retrieving tool disengaged within the wash-over pipe.

FIGURE 11 is a view taken on line 11—11 of FIG. 10.

FIGURE 12 is a view taken on line 12—12 of FIG. 11.

Figure 7:
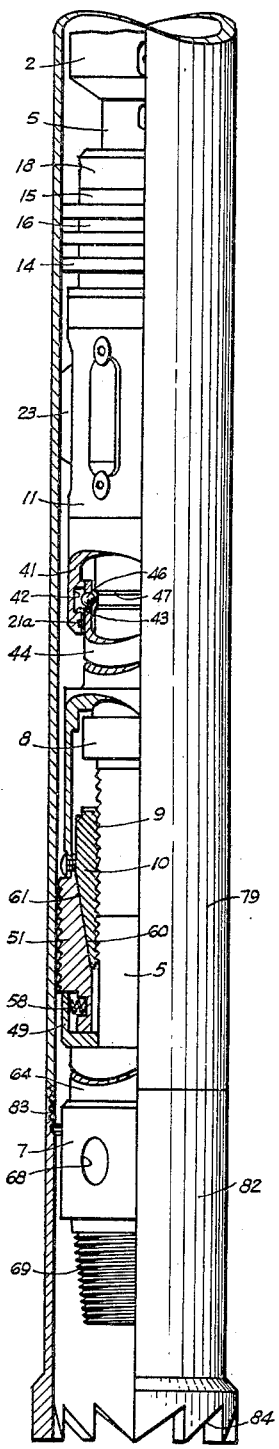
FIGURE 7 is an elevational view with portions depicted in section for purposes of illustration showing the retrieving tool anchored in the wash-over pipe.

Referring to the drawings in detail, and more particularly to FIG. 1, reference character 1 indicates generally a retrieving tool apparatus having an upper sub member 2 threaded internally (not shown) at its uppermost end for a purpose as will be hereinafter set forth. The lower portion of the sub 2 is provided with a threaded portion (not shown) for connection with an elongated tubular mandrel 5 extending downwardly therefrom. The lower end of the mandrel 5 is threadedly connected at 6 with a lowermost circulating sub member 7. The outer periphery of the mandrel 5 is provided with an outwardly extending flange or boss 8 spaced upwardly from the sub 7, and immediately below the boss 8, the mandrel 5 is provided with a plurality of left hand threads 9 cooperating with a complementary threaded bushing 10 for a purpose as will be hereinafter set forth.

An upper sleeve 11 is slidably disposed on the upper portion of the mandrel 5, and the sleeve 11 is provided with a reduced neck portion 12 at the upper end thereof. The sleeve 11 is cut away or recessed at 13 for receiving a plurality of sectional flow restriction members 14 maintained in vertical spaced relationship by an upper spacer ring 15 and intermediate tapered spacer rings 16. The upper end of the sleeve 11 is threaded at 17 immediately below the reduced neck 12 for reception of a hold down nut 18 maintaining the flow restriction members on the sleeve 11 between the nut 18 and a shoulder 19 provided by the recess 13. A locking screw 20 is provided in the nut 18 for cooperation with the reduced neck 12 to securely retain the nut 18 on the sleeve 11 and preclude accidental loss of the restriction members 14. The nut 18 may be backed off by releasing the lock screw 20 whereby the sectional restriction rings 14 may be removed and replaced without removing the upper sub 2 from the mandrel 5.

A packing member 21 is disposed between the nut 18 and the mandrel 5 to preclude any sand or debris from drifting into the top of the tool 1 between the mandrel 5 and the other working parts of the tool to be hereinafter set forth.

The slidable sleeve 11 is provided with a plurality of cut out portions or windows 22 spaced below the shoulder 19 and each of which is adapted to receive a friction block 23 therein. The inner periphery of each of the friction blocks 23 is provided with a plurality of pockets 24 in which are disposed helical spring members 25 anchored at one end in the pockets 24, and at the opposite end against the sleeve 11 for providing an outward thrust on the friction blocks 23. The blocks 23 are secured to the sleeve 11 at the upper and lower portions by suitable screws 26.

A cut away or recess portion 27 (FIGS. 3, 11 and 12) is provided in the sleeve 11 extending substantially between the shoulder 19 and the windows 22 for receiving a pivotal latch member 28 therein. The latch 28 is journalled on a pivot pin 29 which extends transversely across the recess 27 whereby the axis of rotation of the latch 28 is substantially parallel to the axis of the mandrel 5 and sleeve 11. The ring 16 adjacent the shoulder 19 is preferably slightly relieved at 30 (FIG. 12) to provide clearance for the pin 29. A helical spring 31 is disposed around the pin 29 and cooperates with the latch 28 for constantly urging the latch 28 against the outer periphery of the mandrel 5. A longitudinal recess 32 is provided in the outer periphery of the mandrel 5 for receiving the outer latch end 33 therein as depicted in FIGS. 11 and 12 in one position of the mandrel 5 with respect to the sleeve 11, as will be hereinafter set forth, thus securely latching the sleeve 11 and mandrel 5 in a locked position. The end 33 of the latch 28 is provided with a notch 34 to cooperate with the similarly shaped configuration of the groove 32 for precluding any accidental disengagement of the latch from the groove during operation of the tool 1. A split cylindrical cover member 35 is disposed in an annular groove 36 provided on the outer periphery of the sleeve 11 and is secured thereto by a plurality of screws 36a for protection of the latch member 28 during operation of the tool 1.

An annular roller bearing 37 is interposed between the sleeve 11 and the mandrel 5 below the friction members 23. The bearing 37 is disposed adjacent a circumferential shoulder 38 provided on the inner periphery of the sleeve 11, and is retained thereagainst by a suitable lock washer 39. The roller bearing 37 provides for a free rotation of the sleeve 11 with respect to the shoulder 88 on the mandrel 5 during the reaming operation, and provides a non-friction support therebetween.

The lowermost portion of the sleeve 11 (FIG. 1) is provided with suitable threads 40 to which is threadedly secured a lower sleeve 41 slidable on the mandrel 5 with the upper sleeve 11. The inner periphery of the sleeve 41 is recessed or cut away at 42 at the lower end thereof to provide a circumferential shoulder 43. A ball latch sleeve 44 is slidably interposed between the sleeve 41 and the mandrel 5 and is provided with a plurality of circumferentially spaced recesses 45 each adapted to receive a ball 46 therein. An annular groove 47 is provided in the outer periphery of the mandrel 5 for cooperation with the balls 46 and the sleeve 11 to securely lock the sleeve 44 to the mandrel 5 in one position therebetween, as shown in FIG. 1. In this locked position, the sleeve 44 moves vertically with the mandrel 5 and yet does not hinder the independent rotation of the sleeve 11 with respect to the mandrel 5. When the mandrel 5 is lowered with respect to the sleeve 11, as will be hereinafter set forth, the balls 46 will be moved into disposition adjacent the groove 42 as shown in FIG. 7 whereby the balls will be dislodged from the annular groove 47 and free the mandrel 5 from the sleeve 44 for a purpose as will be hereinafter set forth.

The sleeve 44 is threaded at 48 to receive an annular slip cage 49 which is slidably disposed around the mandrel 5. The slip cage 49 is cut away to provide a plurality of circumferentially spaced windows 50 within which a plurality of slips 51 are disposed. The outer faces of the slips 51 are provided with a plurality of teeth or serrations 52 to provide locking engagement with the wash-over pipe as will be hereinafter set forth. A semi-circular recess 53 (FIG. 1) is cut into the upper end of each of the slips 51 for assisting in holding the slips in the windows 50 underneath a screw head 54. The lower end of each of the slips 51 is cut away at 55 to provide for a lower extension 56 having a recess 57 into which is anchored one end of a helical spring 58 with its opposite end anchored against the inner face of the slip cage 49. The slip extension 56 rests on an inwardly directed shoulder 59 of the cage 49.

Each of the slips 51 is provided with an oblique surface 60 sloping outwardly in the upward direction. The bushing 10 on the lower end of the mandrel 5 is provided with a plurality of downwardly inwardly inclined oblique faces 61 adapted to cooperate with the complementary oblique surfaces 60 of the slips 51. The upper end of the bushing 10 is provided with a keyway 62 (FIG. 5) for receiving a key 63 secured on the inner periphery of the cage 49 by suitable screws 63a. The key 63 cooperates with the keyway 62 to preclude rotation of the bushing 10 with respect to the cage 49, and assures that only relative longitudinal movement will be provided therebetween upon rotation of the mandrel 5 as will be hereinafter set forth.

A spring cage or sleeve 64 is disposed around the mandrel 5 between the cage 49 and the lower sub 7 for receiving a helical spring 65 therein (FIG. 1A). The spring 65 has one end anchored against an inwardly directed circumferential shoulder 66 provided at the upper end of the sleeve 64 and the opposite end against the upper surface 67 of the sub 7 for constantly urging the cage 49 upwardly with respect to the sub 7.

Figure 8:
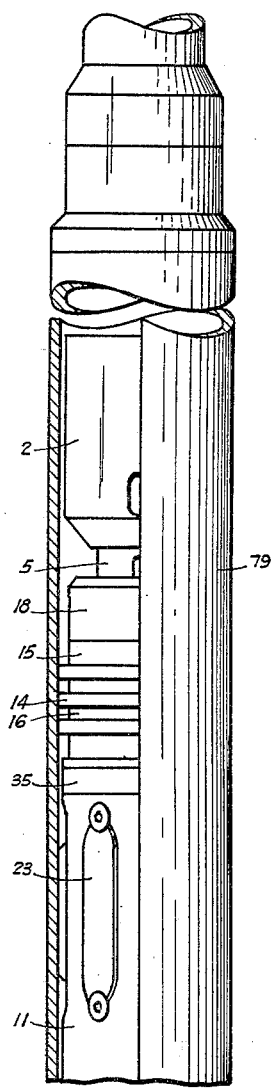
FIGURES 8 and 8A are vertical broken elevational views partly in section illustrating upper and lower portions of the retrieving tool in the wash-over pipe made up with a lost fish.
Figure 8A:
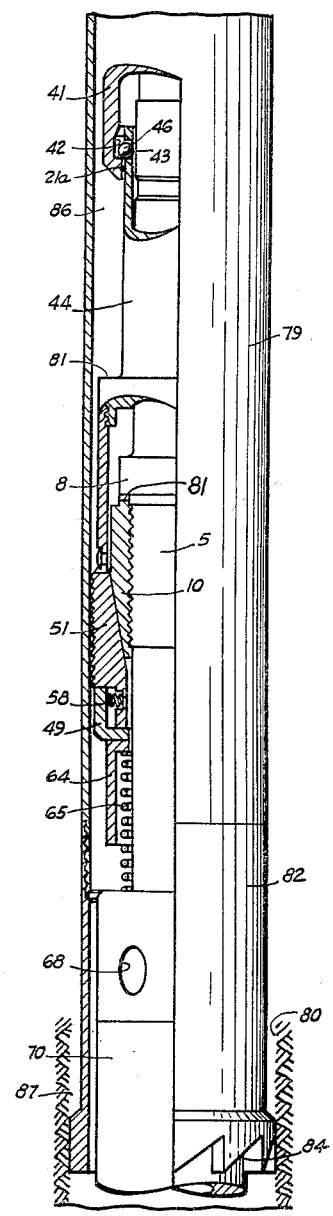

A plurality of circumferentially spaced apertures 68 are provided in the circulating sub 7 to permit fluid circulation through the tool to be discharged from the lower end as will be hereinafter set forth. The sub 7 is provided with male threads 69 at the lower end thereof which function as a pin member adapted to be threaded into the female box (not shown) in the upper end of the stuck drill pipe or fish 70 (FIGS. 8A and 10). A suitable choke member 71 may be threadedly secured at 72 to the lower end of the mandrel 5 and disposed within the sub 7.

A plurality of spaced apertures 73 are provided in the upper portion of the mandrel 5 to permit fluid circulation through the tool 1 during the operation thereof. A suitable locking key 74 may be provided at the threaded connection between the upper sub 2 and the mandrel 5 as well as at the threaded connection 6 between the mandrel and the lower sub 7 to preclude an accidental unthreading of the tool 1. The locking keys 74 are retained in position by a suitable locking screw 75. A plurality of spaced centralizing lugs 76 are secured to the outer periphery of the lower sub 7 by a retaining set screw 77 and are to prevent the wash-over pipe from coming into contact with the serrations 52 of the slips 51 during the independent rotation of the wash-over pipe. The threaded connections between the sleeves of the unit may be retained against accidental locking by suitable locking keys or screw 78.

*Retrieving Tool Setting Operation*

In order to set the retrieving tool, generally indicated at 1, in the wash-over pipe 79 (FIG. 7) prior to running the combined washing and retrieving unit into the well bore 80, the tool unit 1 is preferably disposed in the lower end of the wash-over pipe 79. The engagement between the friction dogs 23 and the inner periphery of the wash-over pipe 79 permits the mandrel 5 to be rotated in a left hand direction independently of the connected sleeves 11 and 41 and the slip cage 49. A left hand rotation of the mandrel 5 moves the longitudinal groove 32 in a direction with respect to the pivotal latch 28 so that the latch will roll over the surface of the mandrel without engaging the groove, as will be apparent in FIGS. 2 and 11. A continued left hand rotation of the mandrel 5 moves the bushing 10 downward on the left hand threads 9 until the tapered faces 61 of the bushing 10 come into contact with the oblique faces 60 of the slips 51 and start an outward movement of the slips for engagement with the wash-over pipe 79. As the initial outward movement of the slips is begun, the retrieving tool unit 1 may be moved in the wash-over pipe 79 for any desired location therein.

When the tool unit 1 reaches the desired location in a section of the wash-over pipe 79, a vertical upward or picking up movement on the wash-over pipe 79 will cause the sectional connecting sleeve members 11 and 41 to move vertically upward therewith due to the contact of the friction dogs 23 with the wash-over pipe 79. However, the mandrel 5 and the slip cage 49 will not move upwardly, but will remain stationary until the balls 46 are moved into the groove 42. In this position, the shoulder 43 will contact the balls 46 and a continued vertical movement of the sleeve 41 will lift the slip cage 49 upwardly around the mandrel 5 and force the slips outwardly into engagement with the wall of the wash-over pipe. The spring 65 urges the slip cage 49 upwardly when the balls are released to provide a quick catching operation of the slips 51. In this operation, the retrieving tool 1 will be suspended in the wash-over pipe 79 in a partially locked condition, with the lower connection 7 preferably extending below the lower end of the wash-over pipe 79 as shown in FIG. 7. A continued left hand rotation of the mandrel 5 when viewed from the lowermost end of FIG. 7 will cause the bushing 10 to move vertically downward and to wedge more tightly against the tapered surfaces of the slips 51 and provide a firm engagement between the wash-over pipe 79 and the retrieving tool 1. The complete unit is then ready to be run into the well bore 80 in the conventional manner.

*General Operation*

The wash-over pipe 79 is run into the well bore 80 (FIG. 8A) upon any suitable supporting string of pipe (not shown) and the retrieving tool mechanism 1 is supported therein by the slips 51 in the manner as has been heretofore set forth. As the lower end of the sub member 7 and the threads 69 approach the top of the stuck fish 70, water or mud circulation acting on the upper surface of the restriction members 14 forces the sleeve assemblies 11 and 41 downwardly and the sleeve 44 will telescope into the sleeve 41 without effecting the position of the slips 51.

A right hand rotation of the wash-over piper 79 will cause the threads 69 to make up in the female box (not shown) of the stuck fish 70. This make up connection can be made up to whatever tightness the retrieving tool 1 was made up in the wash-over pipe 79 as has been heretofore explained. The firm engagement of the slips with the wash-over pipe by rotation of the mandrel 5 as hereinbefore set forth is to permit a tighter make up for the retrieving tool 1 with the lost fish 70, and it is not dependent upon the tightness of the left hand threads 9 between the mandrel 5 and the movable bushing 10.

A further right hand rotation of the combination wash-over pipe 79 and retrieving tool 1 will cause the bushing 10 to travel vertically upward on the left hand threads 9 to cause an unthreading of the bushing 10 until an upper shoulder 81 provided on the bushing 10 contacts the outward flange 8 provided on the mandrel 5 (FIG. 1) thereby placing the retrieving tool 1 in a released position relative to the wash-over pipe 79.

The wash-over pipe is provided with any suitable reamer 82 threadedly connected to the lower end thereof at 83. The reamer 82 is provided with teeth 84 for reaming the well bore 80 as is well known in the art. With the bushing 10 moved upwardly, thereby moving the inwardly inclined oblique faces 61 away from the outwardly sloping oblique surfaces 60 of the slips 51, the slips are then automatically disengaged from the inner periphery of the wash-over pipe 79 by the springs 58. In this released condition, a slow movement upward of the wash-over pipe 79 will cause the friction dogs 23 which are frictionally gripping the inner wall of the wash-over pipe 79 to provide a simultaneous movement upward of the sleeve 11 and its connecting lower sleeve 41, which in turn picks up the slip cage 49 through the operation of the ball latches 46 as hereinbefore set forth, thereby moving the slips 51 outwardly into an engagement with the inner wall of the wash-over pipe so that rotation of the wash-over pipe in a right hand direction will further connect the threads 69 with the stuck fish 70 as tightly as desired. Upon release of the right hand torque, and a downward movement of the wash-over pipe 79, the slips 51 are moved downwardly away from the oblique faces 61, thereby placing the wash-over pipe in a released position for the wash-over operation in the well bore 80, such as shown in FIG. 9A.

When the threads 69 are secured to the fish 70, it will be apparent that further rotation of the mandrel 5 is precluded because it is now secured to the stuck fish 70. Thus, right hand rotation of the wash-over pipe 79 around the stationary mandrel 5 will cause the sleeve 11 to rotate in a right hand direction because of the friction contact between the wash-over pipe and the friction dogs 23. Thus, the wash-over pipe 79 may be utilized in the normal wash-over operation for reaming the well bore 80 around the stuck fish 70 for releasing the stuck fish therefrom. The sleeve 11 will be moved downwardly simultaneously with the wash-over pipe during the reaming operation until the bearing 37 rests on the shoulder 88 of the mandrel 5 (FIG. 1). Further downward movement of the sleeves 11 and 41 is thus precluded, and the connected sleeves 11 and 41 remain vertically stationary with the mandrel 5.

As the wash-over pipe 79 and the attendant reamer 82 move progressively downwardly in the well bore 80, it may become necessary to add additional strings of pipe before the well bore is reamed sufficiently to loosen the stuck fish 70. In some instances, the fish may be stuck in the bore through several hundred feet of strata. In order to complete the washing and reaming operation, it is necessary to move the wash-over pipe downwardly through the bore a sufficient distance to loosen the stuck fish. It will be understood as the washing operation continues that the retrieving tool 1 is in released condition relative to the wash-over pipe 79 and connected sleeves 11 and 41. Furthermore, since the tool 1 is made up with the fish 70, it is in a stationary condition as long as the fish is stuck, or until the fish 70 is loosened by the reaming operation.

In order to add the additional sections of pipe to the drill string supporting the wash-over pipe 79, it is then only necessary to move the wash-over pipe 79 vertically upward with a simultaneous increase on the pump pressure at the surface of the well, which will provide a fluid pressure exerted on the flow restriction members 14 greater than the friction caused by the friction blocks 23 engaging the wash-over pipe 79, thereby permitting movement of the wash-over pipe 79 in a vertically upward movement without movement of the slip cage 49 and the attendant cooperating elements. The fluid pressure in combination with the latched balls 46 prevent the slips 51 from moving upward and into any engagement with the inner periphery of the upwardly moving wash-over pipe 79. When the additional section of pipe has been added to the wash-over string, it is only necessary to move the wash-over pipe 79 vertically downward and resume the wash-over operation.

As hereinbefore set forth, the connecting sleeves 11 and 41 are maintained in a downward position over the mandrel 5 during the addition of pipe sections to the drill string by water or mud circulation or fluid pressure on the top of the restriction members 14. In the event that the pressure of the fluid acting on the restriction members 14 is not sufficient for retaining the sleeves 11 and 41 in the lowered position, they may telescope upwardly over the sleeve 44 and mandrel 5. The wash-over pipe 79 can be rotated in a left hand direction to lock the latch, 28 in the groove 32 and to positively preclude any unlatching or movement of the balls 46 from the groove 47, and thus prevent any accidental engagement of the slips 51 with the wash-over pipe 79. The sleeve 44 is securely locked to the mandrel 5 through the ball latches 46 in the groove 47 in the released position of the slips 51, and since the longitudinal groove 32 is of substantially less length than the travel of the sleeve 44, the slips 51 cannot in any manner become partially engaged upon any lifting of the sleeves 11 and 41 from insufficient pressure. The ball latches 46 cannot be removed from the groove 47 as long as the latch 28 is engaged in the groove 32. This assures that the slips 51 cannot be partially engaged, and that any debris present in the well bore 80 may not become lodged between the slips and the wash-over pipe 79 to cause an engagement therebetween during the insertion of additional pipe sections in the drill string, or the like. When it is desired to proceed with the wash-over and reaming operation, the wash-over pipe is rotated in a right hand direction for unlocking the latch 28 from the groove 32, and the wash-over pipe is moved downwardly in the well bore 80 for continuing the operation.

It will thus be seen that the present apparatus provides for a free wheeling vertical movement of the wash-over pipe 79 for any purpose. The resilient packer members 14 provide the necessary hydraulic pressure to preclude movement of the sleeves 11 and 41 and any outward movement of the slips 51. However, if such fluid pressure is not sufficient, and it is necessary to "yo-yo" the wash-over pipe string to free the teeth 84 from a tight place in the formation, the ball latching sleeve 41 allows limited longitudinal movement without any accidental setting of the slips 51, as hereinbefore set forth.

As the wash-over operation continues and the fish 70 is washed and reamed loose and starts to fall, the retrieving tool 1 will prevent the fish 70 from any substantial downward movement by automatically catching the loosened fish 70. As the loosened fish 70 starts to move downwardly, the connected mandrel 5 will move downwardly simultaneously with the loosened fish 70, however, the sleeves 11 and 41 will remain stationary in the wash-over pipe 79 due to the frictional engagement of the dogs 23 as has been hereinbefore set forth. Furthermore, the resistance to downward movement of the sleeve 11 is also offered by the flow restriction members 14 acting against the fluid in the annular space 86 between the retrieving tool 1 and the inner periphery of the wash-over pipe 79 and the annular space 87 between the wash-over pipe 79 and the well bore 80, it being understood that the circulating fluid is passed in the tool flowing into the tool through the upper ports 73 and discharging from the apertures 68 of the lower sub 7 around the reamer 82 and into the annulus 87. As the loosened fish starts to fall, the connected retrieving tool and fish act as a piston to create a resistance to the fluid pressure in the annulus.

It is to be noted that the packing member 21 precludes downward flow of the circulating fluid between the mandrel 5 and the sleeve 11, thus precluding any passage of fine sand, and the like, into the working parts of the tool 1. A lower packing member 21a provided on the inner periphery of the sleeve 41 below the shoulder 43 and adjacent the mandrel 5 precludes any upward flow of fluid into the working parts of the tool.

The flow restriction gaskets 14 are preferably any suitable rubber packing material, but not limited thereto, and are provided with a diametrical split portion (not shown) in order to facilitate disposition thereof around the sleeve 11. These restriction gaskets have to be replaced many times because of wear, and also because of insertion of the retrieving tool in larger size wash-over pipes for various sizes of well bores. In order to replace the rings 14, it is only necessary to unthread the nut 18 sufficiently to loosen the rings 14 relative to the retaining rings 15 and 16, thus permitting the semi-circular gaskets 14 to be removed and replaced with new ones. In this manner, the speed of the assembly of this portion of the tool is facilitated for replacement of these wearable parts without a complete knock-down or unthreading of the major sleeve portions of the tool.

The slips 51 are engaged with the wash-over pipe 79 substantially instantaneous with the loosening of the stuck fish, and the fish drops only a very few inches to provide a biting engagement and prevent any further dropping of the loosened fish to the bottom of the well bore. The mandrel 5 moves downwardly with the fish 70 as it drops upon being loosened, and when the balls 46 are moved downwardly therewith into alignment with the groove 42, the balls catch on the shoulder 43 to release the sleeve 44 from the mandrel 5 and preclude any further downward movement of the sleeve 44. Thus, the bushing 10 moves downwardly to bring the oblique faces 61 into contact with the oblique faces 60 for moving the slips 51 outwardly into a biting engagement with the wash-over pipe 79 and stopping any further downward movement of the mandrel 5 and the fish 70.

In this condition, the loosened fish is ready to be removed from the well bore along with the combination washing unit. In order to prevent a costly stripping operation, the wash-over pipe 79 is raised in the well bore in any suitable manner until the section of the wash-over pipe 79 in which the retrieving tool 1 is anchored has reached the surface of the well. The wash-over pipe is then held by any suitable holding device, such as slips or the like (not shown), at the well surface and then a letting in string of pipe 4 (FIG. 10) is lowered through the wash-over pipe 79 from the surface of the well and is made up securely in the top of the upper bushing 2 of the retrieving unit 1. In this arrangement, the mandrel is raised upwardly to disengage the slips 51 with a simultaneous movement of the balls 46 into the groove 47, thereby locking the balls as heretofore set forth to prevent any re-engagement of the slips 51. Following a locking of the slips in a released condition, the mandrel 5 is then lowered and rotated in a right hand direction for engaging the latch 28 in the groove 32. In this condition, the slips 51 are latched off and also the friction dog cage 11 is locked off by the latch 28. The retrieving tool 1 may then be lowered within the wash-over pipe 79 by the drill string until the tool 1 is disposed in the lower end section of the wash-over pipe. At this position, a rotation of the mandrel in a left hand direction will release the latch 28 from the groove 32 whereby a continued lowering of the mandrel 5 will release the balls 46 from the groove 47 and set the slips 51 against the wash-over pipe 79.

The drill pipe 4 is then unthreaded from the upper bushing 2 and removed from the wash-over pipe 79. The upper sections of the wash-over pipe are removed from the well bore until the last section thereof is reached, from which the fish 70 will be extending. The fish 70 is then secured at the surface of the well with any suitable holding device, such as slips on a rotary table, or the like (not shown), and after securement, the wash-over pipe 79 is released from the retrieving tool 1, thereby permitting the wash-over pipe to be removed from the tool 1 and leaving the retrieving tool 1 made up with the fish 70. The tool unit 1 may be unthreaded from the fish 70, and the fish may be removed in any conventional manner.

From the foregoing, it will be apparent that the present invention provides for an efficient recovery of drill collars, and the like, which have been stuck in a well bore off the bottom thereof. The novel apparatus provides for a washing around the stuck portion of the drill collar with a wash-over pipe and reamer having a retrieving tool disposed in the lower end thereof and engaging the upper end of the stuck collar so that when it is washed free and becomes loosened, the drill collar is prevented from falling to the bottom of the well by engaging the retrieving tool to the wash-over pipe, after which it may be removed from the well bore, along with the wash-over pipe. The apparatus contemplates a release of the slips for a continued downward movement of the wash-over pipe and its reaming shoe for a complete washing and reaming operation and positively precludes any accidental engagement of the slips with the wash-over pipe in the released condition thereof to prevent any lodging of debris between the slips and wash-over pipe during the vertical movement of the wash-over pipe in the well bore.

Changes may be made in the combination and arrangement of parts as heretofore set forth in the specification and shown in the drawings, it being understood that modification in the precise embodiment of the invention may be made within the scope of the following claims without departing from the spirit of the invention.

We claim:

1. In a combined fishing and wash-over apparatus for retrieving a stuck fish in a well bore comprising a wash-over pipe having a retrieving tool adapted to be positioned therein, said tool comprising an elongated mandrel, a slidable outer sleeve provided on the mandrel, a slip cage disposed on the mandrel and having an upper extension disposed between the mandrel and the outer sleeve, a plurality of circumferentially spaced slips carried by the slip cage and alternately operable to gripping and non-gripping engagement with the wash-over pipe, ball latch means carried by the slip cake extension and movable thereby to one position between the mandrel and the outer sleeve for precluding accidental engagement of the slips in the non-engaged position thereof, friction means disposed on the outer sleeve and engageable with the wash-over pipe, second latch means carried by the outer sleeve and engageable with the mandrel to provide simultaneous movement of the mandrel and wash-over pipe in one direction of rotation thereof, said last mentioned means responsive to rotation of the wash-over pipe in an opposite direction to release the wash-over pipe for independent movement relative to the mandrel, and means carried by the mandrel for a make up connection with the stuck fish.

2. In a combined fishing and wash-over apparatus for retrieving a stuck fish in a well bore comprising a wash-over pipe having a retrieving tool adapted to be positioned therein, said tool comprising an elongated mandrel, means carried by the mandrel for engaging the fish, a slip cage slidably disposed around the mandrel, a plurality of slips carried by the slip cage and alternately operable to a gripping and non-gripping engagement with the wash-over pipe, a friction dog cage slidably disposed around the mandrel above the slip cage, a plurality of friction dogs carried by the friction dog cage and engageable with the wash-over pipe, ball latch means carried by the slip cage and movable thereby to one position between the mandrel and friction dog cage to preclude engagement of the slips with the wash-over pipe, means provided on the friction dog cage for cooperation with said ball latch means to permit engagement of the slips with the wash-over pipe in another position of the slip cage relative to the friction dog cage, and second latch means carried by the friction dog cage and engageable with the mandrel in one position therebetween to provide simultaneous movement between the mandrel and the wash-over pipe, and responsive to rotation of the wash-over pipe in one direction to release the engagement between the mandrel and the friction dog cage for independent movement of the wash-over pipe.

3. In a combined fishing and wash-over apparatus for retrieving a stuck fish in a well bore comprising a wash-over pipe having a retrieving tool adapted to be positioned therein, said retrieving tool comprising an elongated mandrel, a slip cage slidably disposed around the mandrel, a plurality of slips carried by the slip cage and operable for alternate engagement and disengagement with the wash-over pipe, friction cage means slidably disposed around the mandrel, an annular groove provided on the mandrel, a plurality of circumferentially spaced apertures provided in the slip cage, a ball disposed in each of the apertures and extending into the annular groove in one position of the slip cage and mandrel relative to the friction cage means for precluding engagement of the slips, latch means cooperating between the friction cage means and the mandrel to provide simultaneous rotation therebetween in one direction.

4. In a combined fishing and wash-over apparatus for retrieving a stuck fish in a well bore comprising a wash-over pipe having a retrieving tool adapted to be positioned therein, said retrieving tool comprising an elongated mandrel, a slip cage slidably disposed around the mandrel, a plurality of slips carried by the slip cage and operable for alternate engagement and disengagement with the wash-over pipe, friction cage means slidably disposed around the mandrel, means carried by the slip cage and cooperating between the mandrel and the friction cage means to preclude accidental engagement of the slips in the disengaged position, a longitudinal groove provided on the mandrel, a pivotal latch carried by the friction cage means for engaging the longitudinal groove in one position of the friction cage means relative to the mandrel for cooperating with the first mentioned means to preclude accidental engagement of the slips in the disengaged position thereof, and means interposed between the mandrel and the friction cage means for precluding passage of debris into the working parts of the retrieving tool.

5. In a combined fishing and wash-over apparatus for retrieving a stuck fish in a well bore comprising a wash-over pipe having a retrieving tool adapted to be positioned therein, said retrieving tool comprising an elongated mandrel, a slip cage slidably disposed around the mandrel, a plurality of slips carried by the slip cage and operable for alternate engagement and disengagement with the wash-over pipe, friction cage means slidably disposed around the mandrel, an annular groove provided on the mandrel, a plurality of circumferentially spaced apertures provided in the slip cage, a ball disposed in each of the apertures and extending into the annular groove in one position of the slip cage relative to the mandrel and friction cage means for precluding engagement of the slips in the disengaged position thereof, a longitudinal groove provided in the mandrel above the annular groove, a pivotal latch carried by the friction cage means for engaging the longitudinal groove in one position for maintaining the balls in the annular groove, means provided in the friction cage means for releasing the balls from the annular groove in another position of the friction cage means relative to the mandrel, and means interposed between the mandrel and the friction cage means for precluding passage of debris into the working parts of the retrieving tool.

6. In a combined fishing and wash-over apparatus for retrieving a stuck fish in a well bore comprising a wash-over pipe having a retrieving tool adapted to be positioned therein, said tool comprising an elongated mandrel, a slidable outer sleeve provided on the mandrel, friction means carried by the outer sleeve and engageable with the wash-over pipe, a lower sleeve disposed on the mandrel and having an upper extension disposed between the mandrel and the outer sleeve, a plurality of circumferentially spaced slips carried by the lower sleeve and alternately operable to a gripping and non-gripping engagement with the wash-over pipe, a bushing threadedly secured to the mandrel, means provided on the slips for precluding rotation of the bushing whereby one direction of rotation for the mandrel will move the bushing downwardly thereof to provide for radial outward movement of the slips into engagement with the wash-over pipe and an opposite direction of rotation for the mandrel will move the bushing upwardly away from the slips, spring means cooperating between the lower sleeve and the slips for disengaging the slips from the wash-over pipe, ball latch means carried by the lower sleeve extension and cooperating between the mandrel and the outer sleeve to latch the lower sleeve to the mandrel for precluding accidental radially outward movement of the disengaged slips, means provided on the outer sleeve for releasing the ball latch means in one position of the outer sleeve with respect to the mandrel for unlatching the lower sleeve from the mandrel, pivotal latch means carried by the outer sleeve and engageable with the mandrel for simultaneous rotation of the outer sleeve and mandrel in one direction, and means carried by the mandrel for a make up connection with the stuck fish.

7. In a combined fishing and wash-over apparatus for retrieving a stuck fish in a well bore comprising a wash-over pipe having a retrieving tool adapted to be positioned therein, said tool comprising an elongated mandrel, a slidable outer sleeve provided on the mandrel, a lower sleeve disposed on the mandrel, a plurality of circumferentially spaced slips carried by the lower sleeve and alternately operable to a gripping and non-gripping engagement with the wash-over pipe, a bushing threadedly secured to the mandrel, means provided on the slips for precluding independent rotation of the bushing whereby rotation of the mandrel in one direction will move the bushing into engagement with the slips for a gripping of the wash-over pipe and rotation of the mandrel in an opposite direction will move the bushing out of engagement with the slips, friction means carried by the outer sleeve and engageable with the wash-over pipe to provide rotation of the outer sleeve during disengagement of the slips from the wash-over pipe, pivotal latch means carried by the outer sleeve and engageable with the mandrel for cooperation with the friction means to provide simultaneous movement of the mandrel and wash-over pipe in one direction of rotation thereof, said latch means responsive to rotation of the wash-over pipe in an opposite direction to release the washer-over pipe from the mandrel, and means carried by the mandrel for a make up connection with the stuck fish.

References Cited in the file of this patent
UNITED STATES PATENTS

| | | |
|---|---|---|
| 2,762,438 | Naylor | Sept. 11, 1956 |
| 2,869,644 | Brown | Jan. 20, 1959 |
| 2,879,849 | Le Bus | Mar. 31, 1959 |
| 3,003,561 | Le Bus | Oct. 10, 1961 |